United States Patent [19]
Meyers

[11] Patent Number: 6,141,048
[45] Date of Patent: *Oct. 31, 2000

[54] COMPACT IMAGE CAPTURE DEVICE

[75] Inventor: Mark Marshall Meyers, Hamlin, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/699,306

[22] Filed: Aug. 19, 1996

[51] Int. Cl.7 .......................................................... H04N 3/14
[52] U.S. Cl. ........................ 348/294; 348/308; 250/208.1
[58] Field of Search .................................... 348/294, 300, 348/301, 241, 243, 310, 308; 327/363, 261, 276, 538, 317; 250/208.1, 214 A

[56] References Cited

U.S. PATENT DOCUMENTS

| | | |
|---|---|---|
| 3,910,683 | 10/1975 | Nishino et al. . |
| 4,085,411 | 4/1978 | Genesi .................................... 250/214 |
| 4,318,123 | 3/1982 | Knop . |
| 4,323,925 | 4/1982 | Abell et al. . |
| 4,377,753 | 3/1983 | Mir . |
| 4,443,088 | 4/1984 | Ohtaka . |
| 4,463,383 | 7/1984 | Soneda et al. . |
| 4,573,177 | 2/1986 | Petrosky ............................... 250/208.1 |
| 4,612,521 | 9/1986 | Kleefstra et al. ........................ 257/217 |
| 4,689,291 | 8/1987 | Popovic et al. . |
| 4,708,436 | 11/1987 | Kleinknecht . |
| 4,733,096 | 3/1988 | Horiguchi . |
| 4,809,075 | 2/1989 | Akimoto et al. ........................ 348/241 |
| 4,973,833 | 11/1990 | Takada et al. ........................ 250/208.1 |
| 4,994,664 | 2/1991 | Veldkamp . |
| 5,004,901 | 4/1991 | Yoshimoto et al. . |
| 5,076,687 | 12/1991 | Adelson . |
| 5,151,790 | 9/1992 | Takatori et al. . |
| 5,187,358 | 2/1993 | Setani . |
| 5,233,174 | 8/1993 | Zmek . |
| 5,329,312 | 7/1994 | Boisvert et al. ........................ 348/256 |
| 5,340,978 | 8/1994 | Rostoker et al. . |
| 5,444,483 | 8/1995 | Maeda .................................... 348/231 |
| 5,461,425 | 10/1995 | Fowler et al. ........................... 348/294 |
| 5,471,515 | 11/1995 | Fossum et al. . |
| 5,497,269 | 3/1996 | Gal . |
| 5,504,621 | 4/1996 | Okayama et al. . |
| 5,529,936 | 6/1996 | Rostoker . |
| 5,705,807 | 1/1998 | Throngnumchai et al. ............ 356/221 |
| 5,708,263 | 1/1998 | Wong .................................. 250/208.1 |
| 5,754,056 | 5/1998 | Sauer ...................................... 324/679 |
| 5,760,834 | 6/1998 | Rostoker ................................. 348/340 |
| 5,784,178 | 7/1998 | Tsai et al. ............................. 250/208.1 |
| 5,814,803 | 9/1998 | Olmstead et al. ........................ 250/568 |
| 5,838,176 | 11/1998 | Delbruck et al. ......................... 327/95 |
| 5,841,126 | 11/1998 | Fossum et al. ....................... 250/208.1 |
| 5,844,238 | 12/1998 | Sauer et al. ........................... 250/332 |

FOREIGN PATENT DOCUMENTS

| | | |
|---|---|---|
| 54-154727 | 11/1979 | Japan . |
| 54-154728 | 11/1979 | Japan . |
| 59-193699 | 9/1984 | Japan . |
| 8-107194 | 10/1994 | Japan . |

*Primary Examiner*—Wendy Garber
*Assistant Examiner*—Aung S. Moe
*Attorney, Agent, or Firm*—James D. Leimbach

[57] ABSTRACT

The image capture device incorporates an array of photodetectors, utilizing an integral current mirror formed at each photodetector location to increase photodetector current output. A correlated double sampling circuit is also formed at each photodetector location to sum the current generated by the current mirror over each exposure period, so as to produce a voltage proportional to the radiation intensity incident at each photodetector location. The correlated double sampling circuit is used to reduce noise in the photodetected signal and to eliminate the effect of dark current. Combining the image capture device with a unique lenslet array forms an extremely compact optical array camera. An embodiment with a mechanical shutter is also disclosed.

15 Claims, 6 Drawing Sheets

COMPACT IMAGE CAPTURE DEVICE

CROSS-REFERENCE TO RELATED APPLICATIONS

The present application is related to U.S. application Ser. No. 08/652,735, filed May 23, 1996, by Mark M. Meyers, and entitled, "A Diffractive/Refractive Lenslet Array;" U.S. application Ser. No. 08/417,422, filed Apr. 5, 1995, by Mark M. Meyers, and entitled, "A Blur Filter For Eliminating Aliasing In Electrically Sampled Images;" U.S. application Ser. No. 08/663,887, filed Jun. 14, 1996, by Mark M. Meyers, and entitled, "A Diffractive/Refractive Lenslet Array Incorporating A Second Aspheric Surface;" U.S. application Ser. No. 08/684,073, filed Jul. 18, 1996, by Mark M. Meyers, and entitled, "Lens."

FIELD OF THE INVENTION

This invention relates generally to the field of image capture devices and more particularly to an improvement that integrates circuits into the areas between the individual photodetectors forming the image capture device and to their combination for forming an optic array camera.

BACKGROUND OF THE INVENTION

U.S. Pat. No. 5,471,515, to Fossum, et. al., entitled "Active Pixel Sensor with Intra-Pixel Charge Transfer." This invention converts the photogenerated charge stored under the photogate into a voltage by transferring the charge to a sense node (typically a capacitor) located within the active pixel unit cell. Fossum then utilizes dual sample correlated double sampling of the voltage based signal to reduce signal noise and eliminate the effect of dark current from the photosensor. The voltage associated with the image exposure is then subtracted from the voltage associated with a read during a dark sample by a voltage differencing amplifier located at the end of the row or column of the photosensors. By using appropriate row and column selection transistors a subsection of the array can be read out without the need to read out the entire image array. The Fossum invention does not however allow for an increase in the overall sensitivity of the CCD detector elements, nor does it envision the utilization of an array optic type structure to form an image of different segments of the field of view, although the patent does disclose the use of a lens array for concentrating light on the active pixel. Fossum does not include means for adjusting the overall exposure level of the pixel internal to the unit cell of the detector array. Fossum is also performing most of the signal processing in a voltage amplification mode, whereas the present invention utilizes the advantages of the current mode of signal processing.

In U.S. Pat. No. 5,004,901, entitled "Current Mirror Amplifier for use in an Optical Data Medium Driving Apparatus and Servo Circuit" to Yoshimoto, et. al., photogenerated current from an optical disk tracking and read sensor is amplified in fixed steps by a switchable series of current mirrors, where the current mirrors achieve current multiplication through the use of output stages that incorporate either multiple output transistors with the bases of the output transistors connected in parallel or by the use of output transistors with emitter areas that are integral multiples of the emitter areas of the input side transistor. The purpose of Yoshimoto's invention is to allow the utilization of received photocurrents with a large dynamic range by multiplying the input current by an adjustable ratio, where the multiple current ratios are selected through a switchable network of differential amplifiers. Yoshimoto's invention is not related to the field of array image sensors and requires the use of a switchable array of differencing amplifiers. Yoshimoto's invention does not integrate the current from the photosensor and the current is continuously generated by received light from the laser light emitted by the optical disk head. Therefore, the sensor is not exposed to an image with its sensed signals being integrated by signal processing electronics, as in the current invention, but is rather used in a continuous optical disk position monitoring mode. Yoshimoto does not utilize dual slope correlated double sampling for noise reduction as disclosed in the present invention. Yoshimoto does not make any mention of the use of array optics with a field of view which varies as a function of radial position in the sensor array.

SUMMARY OF THE INVENTION

The present invention is directed to overcoming one or more of the problems set forth above. Briefly summarized, according to one aspect of the present invention there is provided a photosensitive array comprised of a plurality of current generating photodetectors in combination with a plurality of multiplying current mirrors wherein each multiplying current mirror is comprised of one input transistor and two or more output transistors or an output transistor with an emitter area which is N times the area of the input transistor. The photocurrent from each photodetector is multiplied by an integer equal to the number of output transistors in the multiplying current mirror.

From the aforementioned it can be seen that it is a primary object of the present invention to provide an improved photosensor array incorporating integrated support electronics.

It is yet another object of the present invention to provide a short focal length camera based on the improved photosensor array of the present invention.

It is another object of the present invention to provide a compact photosensor array that incorporates support electronics close to the source of generated photocurrent.

These and other aspects, objects, features, and advantages of the present invention will be more clearly understood and appreciated from a review of the following detailed description of the preferred embodiments and appended claims, and by reference to the accompanying drawings.

Advantageous Effect of the Invention

The present invention has the advantages of increased signal current produced by a combination of current mirrors positioned in close physical proximity to associated arrayed photodetectors where the increased signal current represents an increase in sensitivity for the photosensor array. This increased sensitivity, in turn, allows for the use of shorter exposure times, or the use of optics with smaller numerical apertures when the photosensor array is used in a camera. The use of lower numerical aperture optics (higher F/#'s) in a camera allows for greater depth of focus, easier alignment of optics and photosensor and in general decreased system costs. In the camera implementation of the invention either a mechanical or an electrical shutter may be used.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
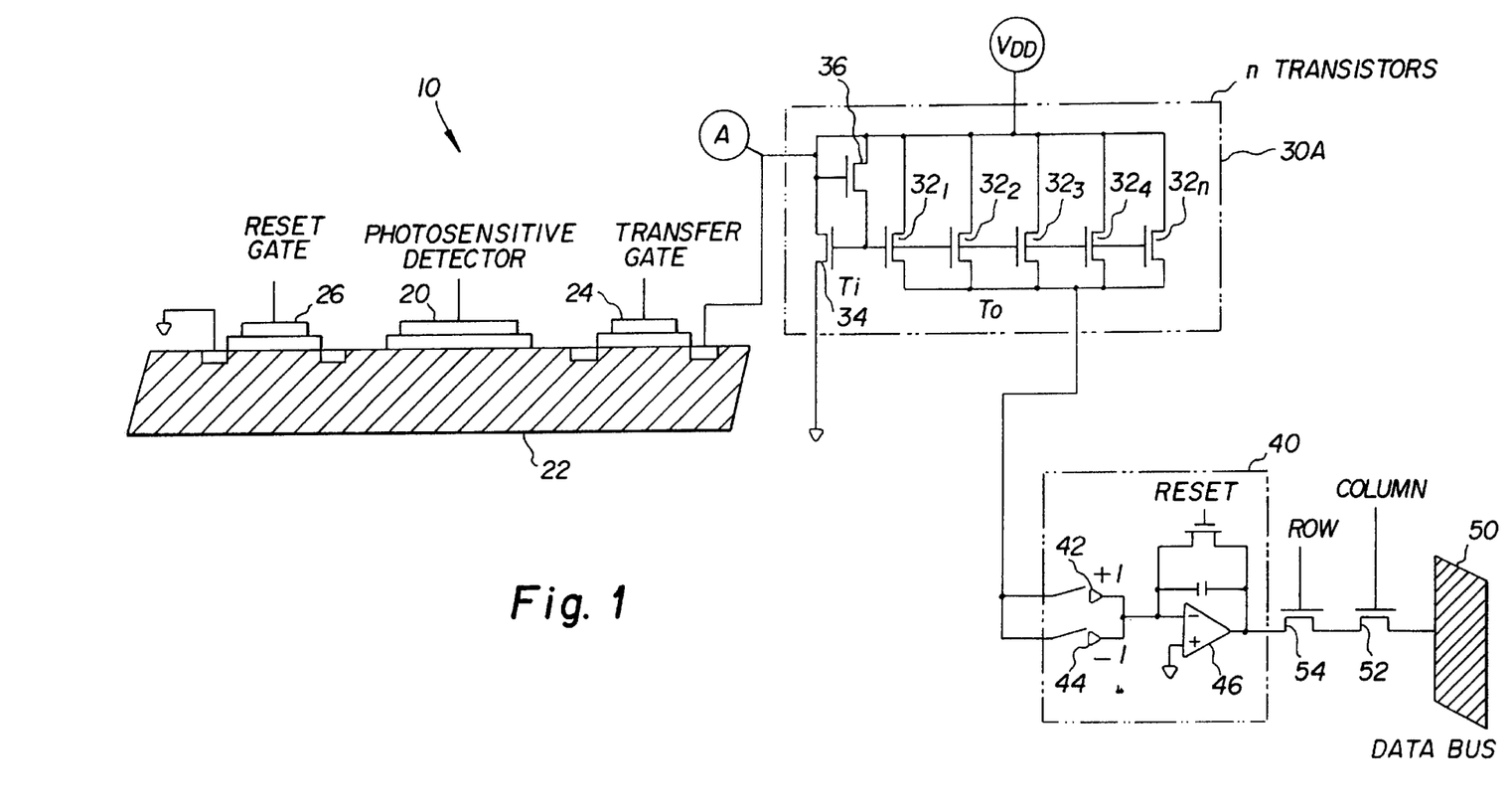
FIG. 1 is a schematic diagram of a unit pixel assembly that may be arranged in an array and used in a device such as a camera to capture an image.
Figure 4:
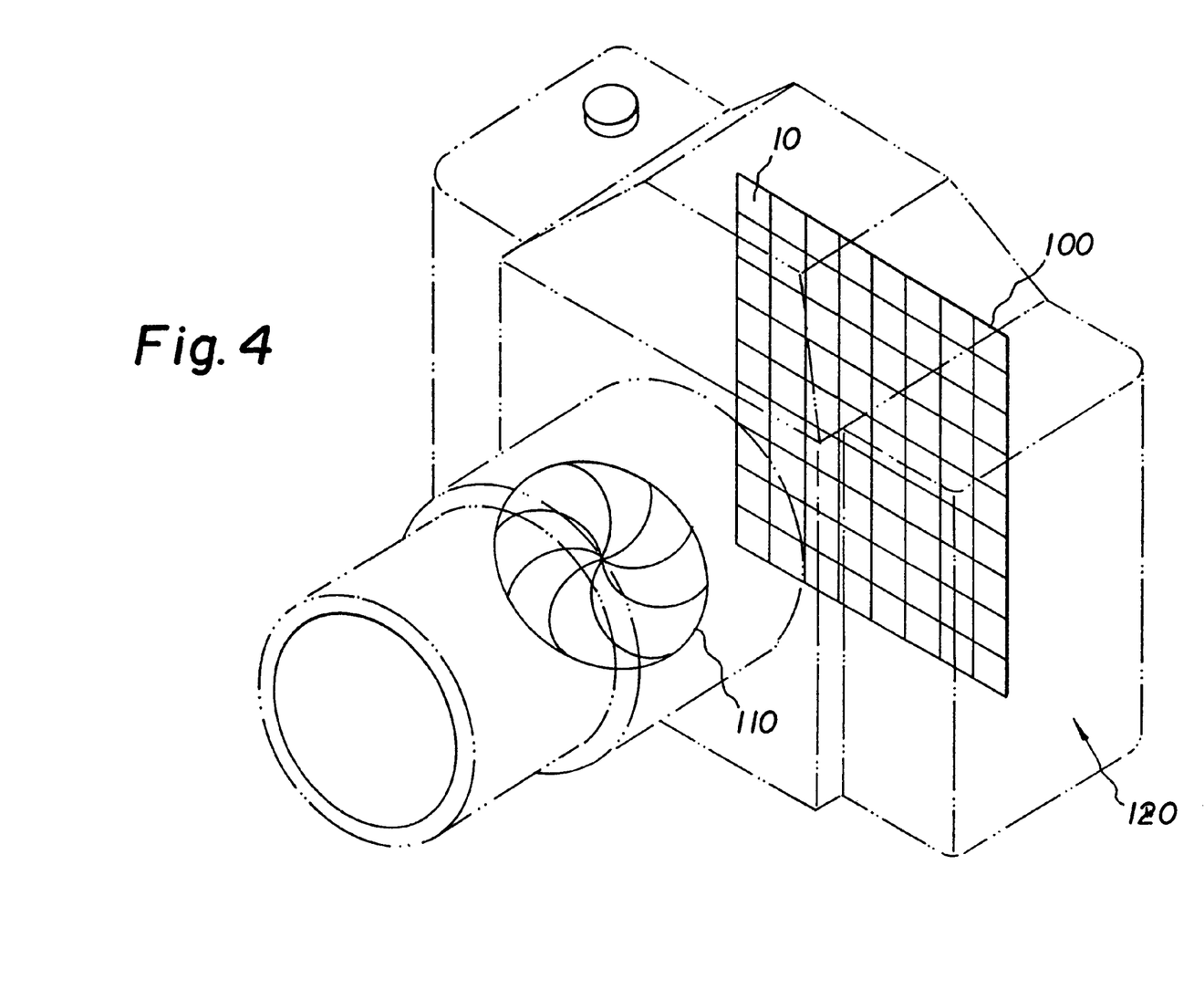
FIG. 4 is a perspective view of an electronic camera incorporating a plurality of unit pixel subassemblies arranged as a photosensor array located at the focal plane of the objective lens.

Referring to FIG. 1, a unit pixel subassembly 10, forms part of a camera's photosensor array 100 (see array of FIG. 4). The unit pixel subassembly 10 is comprised of a photodetector 20, which may be, for example, a CCD device and/or a photodiode. The output 22 of the photodetector 20 is connected to a transfer gate 24, a reset gate 26, and a multiplying current mirror 30A. The transfer gate 24 allows the charge, accumulated by the photodetector 20 during the exposure period, to be transferred to the multiplying current mirror 30A at the desired time. When closed the reset gate 26 allows for the emptying of the photodetector's 20 accumulated charge from the previously completed exposure. When the reset gate 26 is opened and the camera's shutter 110 (see FIG. 4) is closed the output from the photodetector 20 is integrated for a time equivalent to the previous exposure time so as to cancel dark current and noise. This cancellation occurs within a correlated double sampling circuit 40. The photosensor array 100 is then ready for exposure to a new image.

As is well known the output of the current mirror 30A is a multiple of the current produced by the photodetector 20. The current multiplying effect is traditionally accomplished either by connecting the bases or gates of the transistors $32_1$ through $32_n$ in parallel with each other or by making the emitter (or source) areas larger by an integral multiple of the emitter area of an input slide transistor 34. Current mirrors of this type operate on the principle that the emitter base voltage (or the gate source voltage) for all the transistors in the current mirror are the same so that each of the collector (drain) currents is the same, and therefore the sum of the currents from the output side $T_o$ is a multiple of either the number of transistors in the output side or the ratio of the area. This current multiplication is represented mathematically as follows as:

$$I_{out}=n*I_{in}$$

where n=number of transistors on the output side "$T_o$" of the current mirror or $n=A_{out}/A_{in}$=the ratio of emitter areas With detailed analysis it can be shown that output current is not as simple as the above equation and is more accurately represented by $$I_{out}=n*(I_{in}/(1+\beta))$$

where

β=transistor current gain (typically between 50 and 200)

In another embodiment of the current mirror 30A a transistor 36 can be added to the input side $T_i$ of the current mirror to drive the bases (or gates) of the output side $T_o$ of the current mirror and thereby reduce the effects of leakage current. This is known to reduce the non-ideality of the above equation to $$I_{out}=n*(I_{in}/(1+\beta^2))$$

The output of the current mirror 30A is switched between two current amplifiers, amplifiers 42 and 44, with gains of +1 and −1, respectively. When the photodetector 20 is receiving incident light its amplified current is switched through the +1 gain of amplifier 42 into an integrating amplifier 46 for a given amount of time and then after the shutter is closed the current is integrated through the −1 gain of amplifier 44 for an equal amount of time. This operation is known as dual slope, correlated double sampling and it eliminates the effects of dark current and KTC noise. It differs from dual sample CDS in that the signal is switched through two different amplifiers depending on whether the signal represents the image data or the background data wherever dual time CDS uses the same amplification chain. Correlated double sampling also reduces Johnson noise, flicker noise and 1/f noise. A similar effect can be achieved by integrating the current from an opaquely masked photodetector through the −1 gain of amplifier 44. Using an opaquely masked photodetector adjacent to the active photodetector 20 allows the correlated double sampling technique to be implemented in parallel and decreases readout time. The integration of the outputs of the current amplifiers 42 and 44 occurs simultaneously, thus eliminating the need to wait for two integration periods to have output data. However, since separate photodetectors are used, small differences in dark current and noise can arise between them.

The output of the correlated double sampling circuit 40 is selectively connected to a data bus 50 by means of row and column selection transistors 54 and 52, respectively. The incorporation of the row and column selection transistors in the pixel unit cell allows for addressing of subsections of the photosensitive array for more rapid image readout in a specific area of interest in the image. This is useful in digital cameras which monitor a scene and are only interested in updating the section of the image associated with moving objects.

Figure 2:
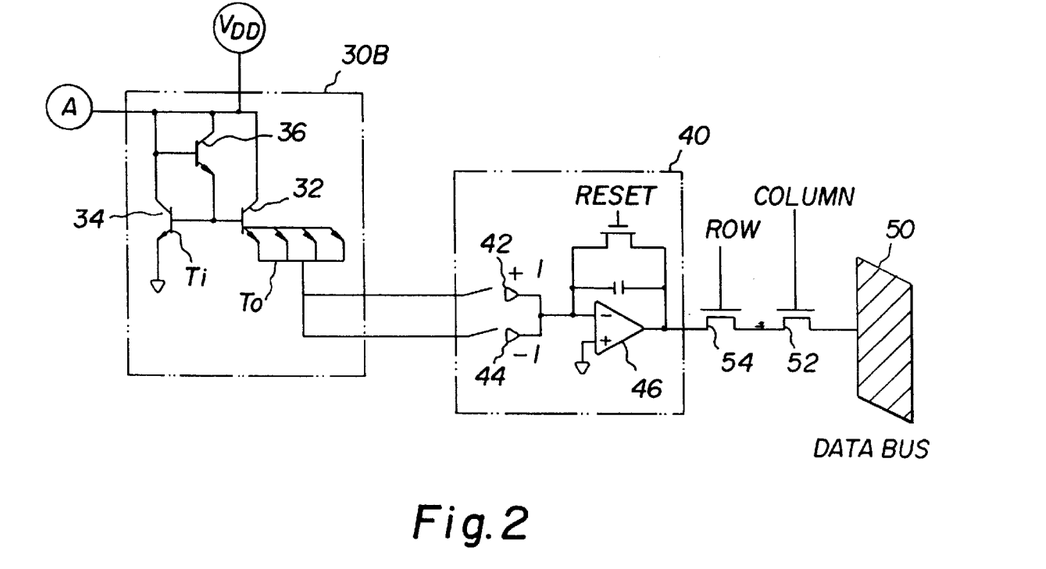
FIG. 2 is a circuit diagram of an alternate embodiment of a portion of the unit pixel assembly of FIG. 1.

Referring to FIG. 2, a current mirror circuit 30B that may be substituted for the current mirror 30A provides a second variant of the current mirror function by utilizing an output transistor $T_o$ emitter or source whose area is n times the area of the emitter or source of the input transistor $T_I$. This forms a smaller circuit which in turn allocates more area to the photodetector 20. Current mirror 30B would be substituted for the current mirror 30A at the connection point marked with a circled A.

Figure 3:
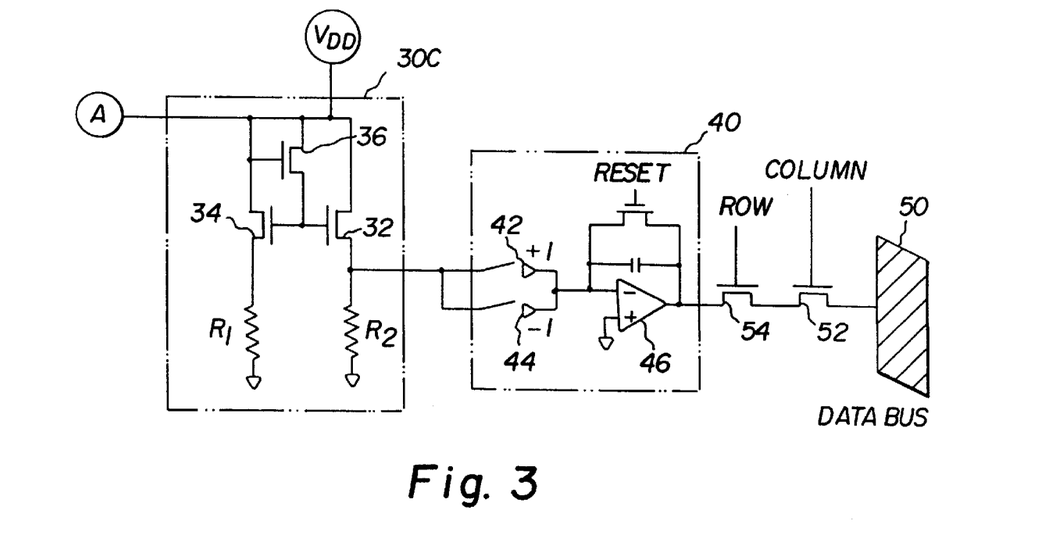
FIG. 3 is a circuit diagram of another embodiment of a portion of the unit pixel assembly of FIG. 1.

FIG. 3 illustrates a variant of a current mirror labeled 30C that is connectable to the unit pixel subassembly 10 of FIG. 1 at the A labeled point marked with a circle in place of either 30A or 30B. The current mirror 30C achieves current multiplication by biasing the emitter base (or gate source) voltage higher on the input side of the current mirror than on the output side. This, more specifically, is accomplished by adjusting the value of R1 and R2. Alternately, a diode junction can be substituted into the emitter or source of the input side of the current mirror 30C in order to provide a fixed voltage bias.

For a bipolar implementation of the multiplying current mirror, this technique can be illustrated by the ebers-moll relation, which is given by $$I_{tr}=I_s * e^{(vbe/kt-1)}$$

where $$V_{bei}=V_{beo}+0.060\ v$$

allows for a current multiplication of approximately 10× at 300 k.

A plurality of unit pixel subassemblies 10, described with respect to FIGS. 1–3, find particular utility in a photosensor array, such as the photosensor array 100 illustrated in conjunction with a camera 120 and a shutter 110 in FIG. 4 for sensing image radiation. Unlike conventional photosensor arrays, photosensor array 100 contains unused areas at each photodetector site. It is within these areas that the circuits 30A, B, or C, and circuit 40, along with row and column selection transistors 52 and 54 are located. As previously mentioned the placement of these circuits and transistors in close proximity to their associated photodetector 20 makes a more efficient photosensor array and reduces the need for external support circuitry.

To provide the open space between photodetector sites without degrading the resolution of the camera a unique lens array is used. The array is described fully in U.S. patent application Ser. No. 08/652,735, filed on May 23, 1996, by Mark M. Meyers, the inventor of the present application, and entitled, "A Diffractive/Refractive Lenslet Array." Portions of the application will be used herein to provide support for the claims of this invention.

Figure 5:
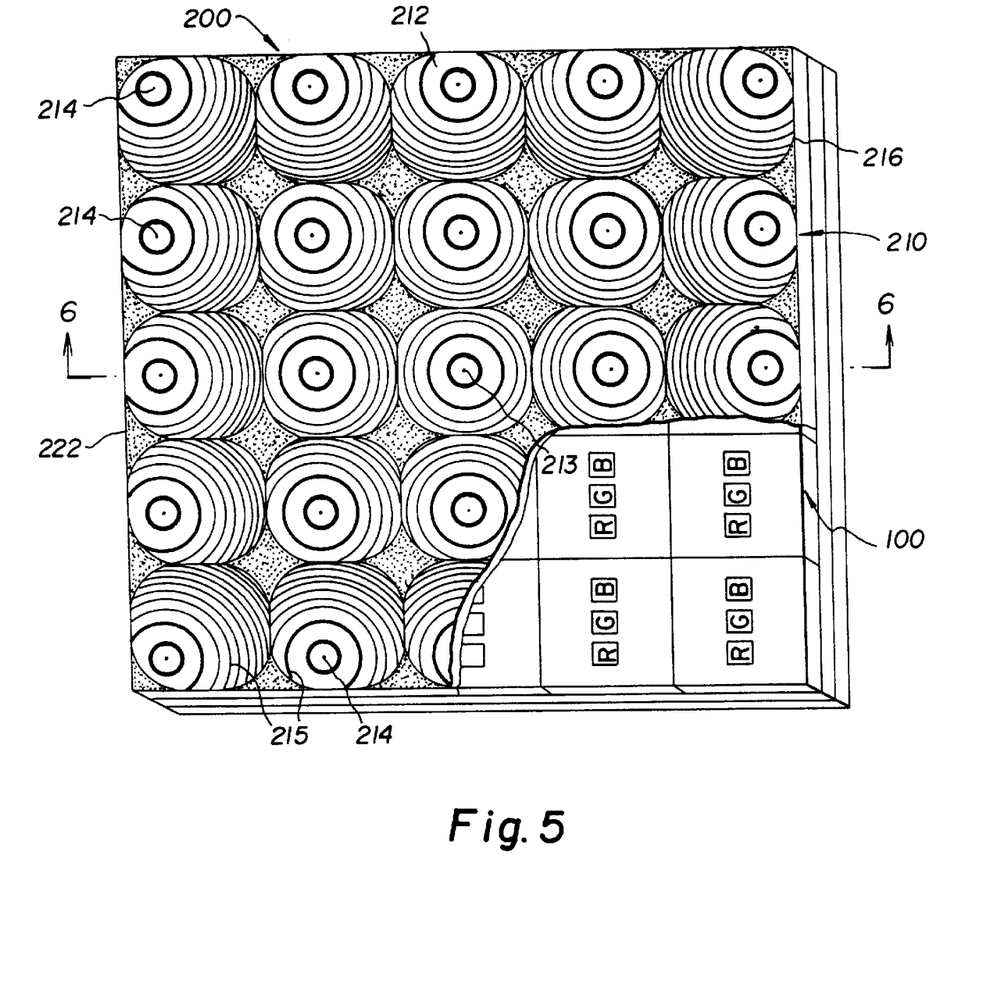
FIG. 5 is a top view of an optic array camera incorporating a plurality of unit pixel subassemblies.
Figure 6:
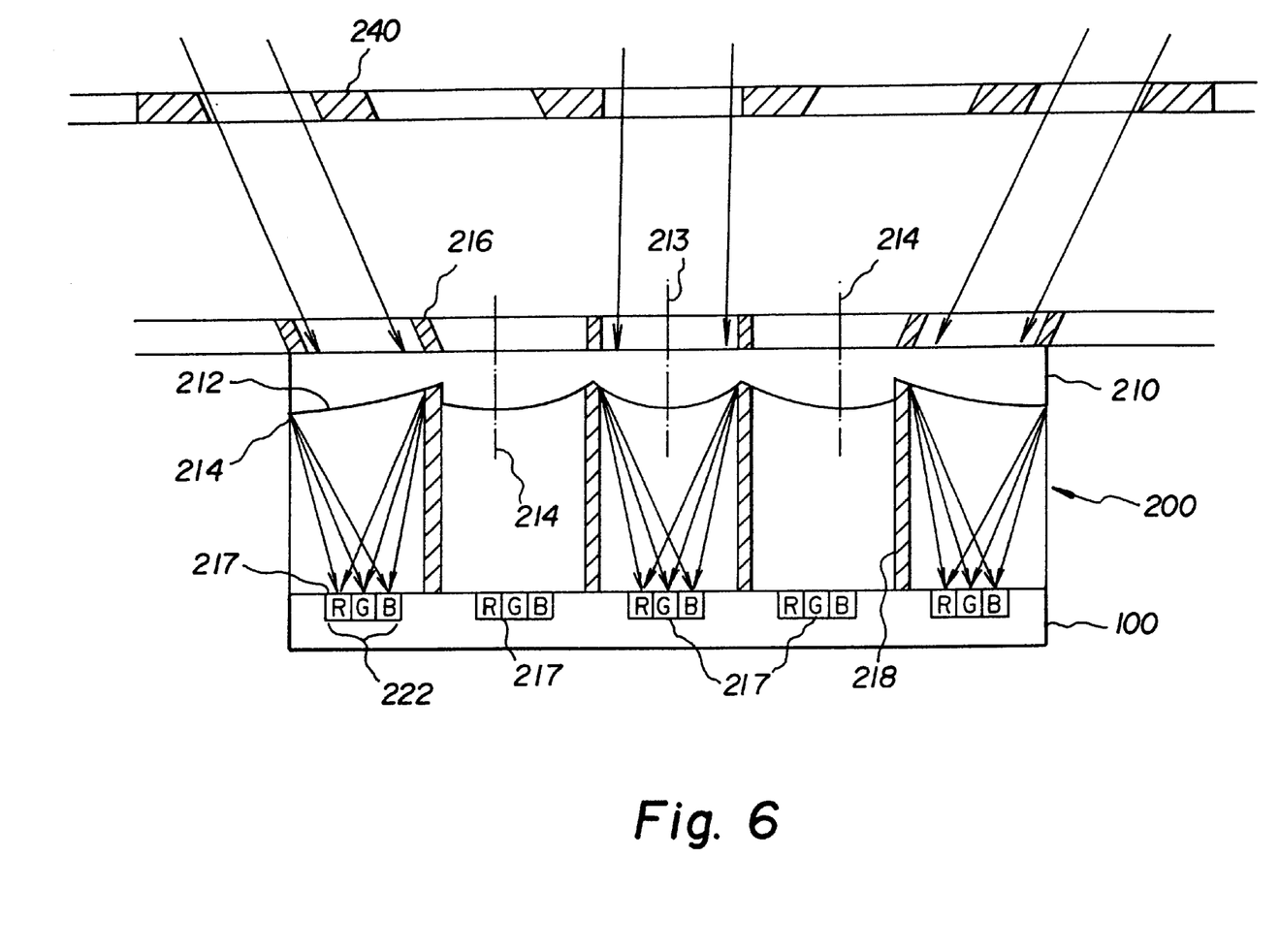
FIG. 6 is a section view of the photosensor array of FIG. 5 taken along the section lines 6—6.

FIG. 5 illustrates an optic array camera 200 incorporating the photosensor array 100 and a lenslet array 210. FIG. 6 illustrates a cross-section of the optic array camera, taken along the section lines 6—6, in FIG. 5. Referring to FIGS. 5 and 6 together, the optic array camera 200 is formed with an array 210 of achromatized refractive/diffractive lenslets 212 or refractive lenslets which are centered over photosensitive sites 217. The array of lenslets 210 replaces the typical single round lenses that are spaced along one central axis in a camera. To be observed in FIG. 5 is that the center of the mechanical optical axis 214 of each lenslet 212 is displaced relative to the fixed sensor-to-sensor distance as a function of its radial distance from the optical axis 213 of the central lenslet which is at the physical center of the array shown. The lines 215 appearing around the mechanical optical axis 214 of each lenslet 212 are topographical lines indicating changes in height of the lenslet's surface. An opaque mask 216 covers the areas between the lenslets 212 to prevent light from reaching the photodetectors (photosensor) other than by passing through a lenslet. The array depicted in FIG. 6 represents only a small portion of an array that is used in an actual camera. A typical implementation could consist of 280×640 pixels with 3 pixels per lens. Other configurations of the lenslets may be used such as forming the outer periphery of each lenslet 212 as a square, hexagon, or circle, without detracting from the invention.

In order for the array to see different fields of view the optical axis 214 of the lenslets 212 in the lens array 100 are located at a distance which becomes progressively larger than the center-to-center distance of the pixels in the array. The displacement of the lenslets optical axis 214 increases radially from the center of the array. Decentering a lens element tends to bend rays from off-axis field angles into the center of the lens groups field of view. By moving the optical axis of the lens element further out radially with increasing distance from the center of the array, the angular location of an object at the center of the field of view for a given lenslet/photodetector pair originates from increasingly off-axis segments of the total field of view.

For instance, the required decenter, for an array element of focal length $Fl_i$, necessary to deflect a ray from the desired field angle into the center of the array element's field stop can be determined from the paraxial ray tracing equations. The paraxial equations are $$y'=y_o+nu(t/n) \quad n'u'=n_ou_o-y\phi$$

where
  y'=height after propagation to next surface
  $y_o$=height at previous surface
  u=paraxial slope angle (radians)
  $u_o$=slope angle before refraction
  $\phi$=power of array element ($\phi=1/FL_i$)
  n=refractive index of the medium Therefore, the displacement for a given lenslet with power $\phi$ ($=1/FL_i$) that is necessary to bend the central ray from a given angle of incidence $u_o$ to a desired angle u', after refraction is given by $$d=y=(n_o u_o - n'u')/\phi$$

The invention utilizes an array of lenslets where the local displacement of the lens group's optical axis varies as a function of radial position relative to the center of the system's image optical axis, so that, to first order $$d(r)=(n_o u_o(r) - n'u'(r))/\phi$$

The invention consists of adjusting the lenslet decenters so that u'(r)=0 for the central ray within a given lenslet's field of view. In this case the decenter necessary for a given element is approximately a linear function of the element's radial distance from the system's optical axis.

Referring again to FIG. 6, the lenslet array 210 is positioned over the photosensor array 100 of grouped photosensors 222. Each photosensor group 222 is located at an associated photosensitive site 217. Each group of photosensors 222 is formed with red (R), green (G), and blue (B) sensors. The number of photosensitive sites 217 corresponds in number to at least the number of lenslets 212 in the lenslet array 210. The lenslet array 210 is maintained a distance apart from the surfaces of the photosensors by spacers 218 that serve the additional function of being light baffles. The opaque masks 216 on the lenslet array 210, combined with a field stop aperture plate 240 limit the field of view of any particular photosensor so that it does not overlap the field of view of its neighbors by a large amount. The aperture plate 240 is positioned approximately 0.5 mm to 2 mm from the surface of the lenslet array 210. The aperture plate 240 may be a layer of clear glass having a photoresist mask pattern formed on one of it's surfaces.

The center of the apertures in the aperture plate 240 are aligned to the center of the field of view of a corresponding lenslet. The spacing of the mechanical optical centers 214 increases as a function of each lenslet's radial position radially from the center of the array causing the aperture plate 240 to be slightly larger than the associated lenslet array 210. The combination of the opaque areas 216 with the aperture plate 240 and a given lenslet focal length determines the field of view for a photosensitive site 217. The lenslet array 210 can be formed of etched quartz, or an epoxy replica on a glass substrate or can be injection molded plastic.

The lenslets 212, combined with the appropriate field stop aperture plate 240, form images of a small segment of the field of view on each photosensitive site 217. By forming the lenslets 212 with decentrations of the mechanical optical axis 214 which increase radially across the lenslet array the angle which the axial ray incident on any particular lenslet makes with the surface normal of the plane of the lenslet array 210 will increase as a function of the particular lenslet's radial position on the array. Therefore, by appropriately forming the decenters of each lenslet each photosensitive site 217 will view a different segment of a scene (image). Since each photosensor group 222 has its own lenslet there is no need to reinvert the image with a relay lens.

Therefore, any camera system, incorporating the present invention, can be extremely compact and flat due to the integration of the above described circuitry which allows for the elimination of support circuit boards which in turn allows for a further decrease in the size of the camera. The camera can work in black and white or in color if three unit pixel subassemblies with color filters are formed at each pixel site 217 to pass only assigned frequencies of incident radiation. The use of a lenslet that will physically displace incident radiation may be used in lieu of color filters to deflect the appropriate frequency of incident radiation to its assigned photosensor.

An array of aspheric lenslets can also be used to form images on the photosensor array 100. However, the aforementioned embodiment does not correct for the variation in focal length as a function of wavelength since the lenslet is formed from a single refractive material, therefore the spot size of the incident light varies as a function of color.

By utilizing a multiplying current mirror to increase the photocurrent generated at each photosite the effective sensitivity of the photosensor array is increased. Prior art photosensitive arrays (such as CCD arrays) require the use of lenses with very high numerical apertures (low F/#'s, typically on the order of F/1.8 to F/4.0) which are more difficult to align, harder to keep in focus and in general cost more than lower F/# objective lenses. For an array optic camera with a field of view which varies as a function of radial position in the photosensitive array, the use of a photosensor unit cell with increased sensitivity will allow for the use of lower F/# optics. The definition of lens F/# is F/#=Focal Length/Lens Diameter Reducing each lenslet's F/# allows for the reduction of the center-to-center spacing between array elements, since, for a given F/# and detector sensitivity a specific photocurrent is generated. The illumination incident on the detector array from a given lenslet is proportional to the $(F/\#)^2$. Therefore, if the sensitivity is increased by x, the F/# can be reduced by $x^{1/2}$. For instance, if an array optic camera, without multiplying current mirror, is used with a lenslet having a F/#=4.0 and a FL=0.5 mm the lenslet's diameter would be 250 µm. Therefore, if an array optic camera is formed with 780 by 640 pixels the length of the long dimension of the array would be 32.5 mm, assuming 3 color pixels (photosensors) at each photosite. This would require a large area of silicon per photosensor array, which would increase part costs and result in lower yields of photosensors from a given wafer size. By incorporating a current mirror with a multiplication factor of 16 at each photosite the lenslet diameters can be reduced by 4x to 65 µm and the length of the array will be reduced to 8.125 mm, resulting in higher photosensor yields and lower part costs. The array optic camera can utilize this technique with no decrease in usable photosensitive surface area since the space between photosites is not utilized for light detection, but is rather, empty space.

Figure 7:
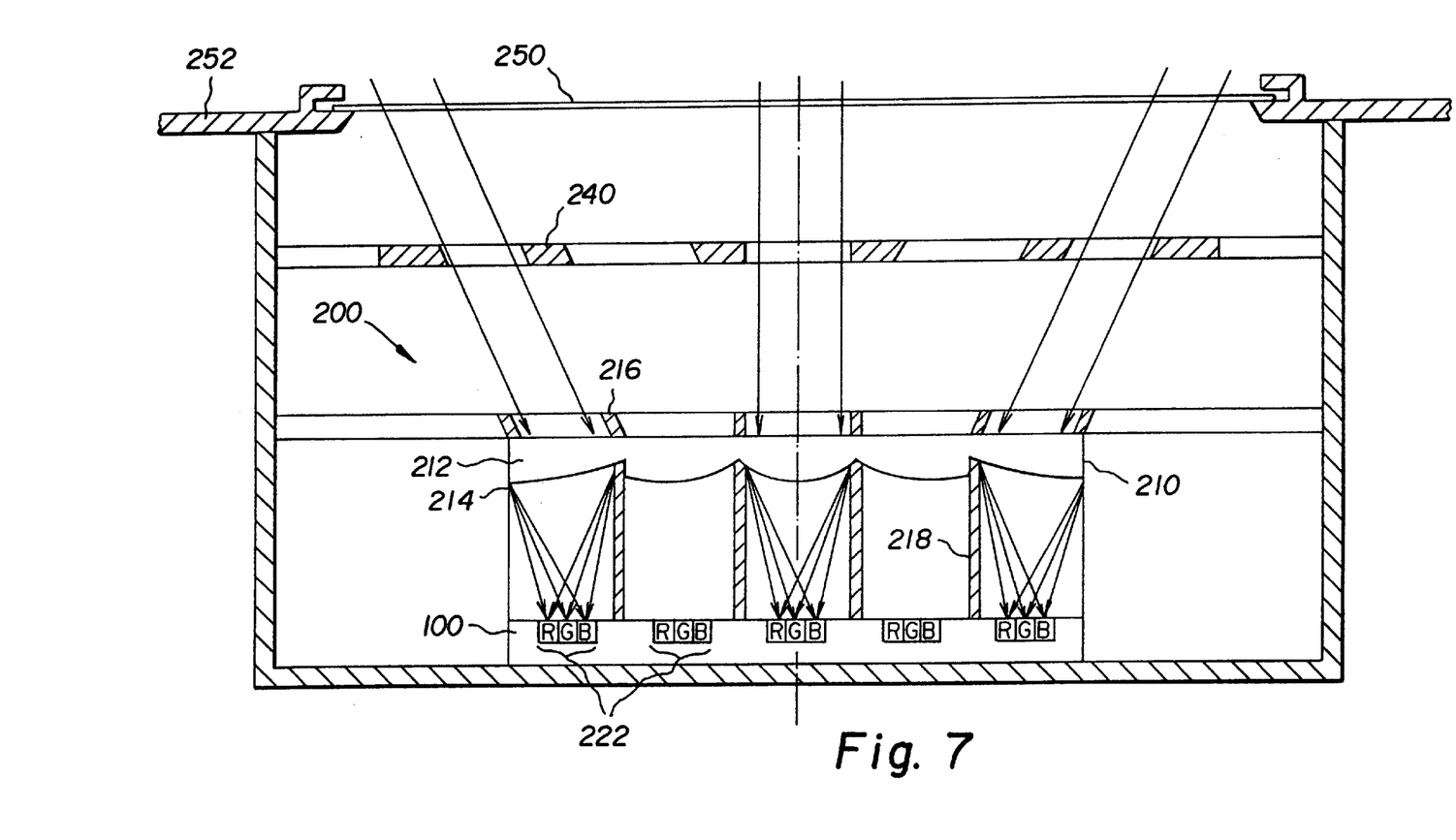
FIG. 7 illustrates a camera using a mechanical shutter in combination with the photosensor array of FIGS. 5 and 6.

FIG. 7 illustrates the optic array camera 200 of FIG. 6 positioned in a light tight housing 252 that is exposed to an image via a mechanical shutter 250. The mechanical shutter may be any of the typical shutters used in a film type camera. The advantage to the optic array camera 200 of FIG. 6 is that no mechanical shutter is required; the photosensors 222 are turned "on" or active to capture light from the image focused onto the photosensor array 100. In the FIG. 7 embodiment the photosensors 222 are turned "on" generally when camera power is on and image capture occurs when the shutter 250 is activated.

The invention has been described with reference to a preferred embodiment; However, it will be appreciated that variations and modifications can be effected by a person of ordinary skill in the art without departing from the scope of the invention.

| | PARTS LIST: |
|---|---|
| 10 | unit pixel subassembly |
| 20 | photodetector |
| 22 | output |
| 24 | transfer gate |
| 26 | reset gate |
| 30A | multiplying current mirror |
| 30B | current mirror circuit |
| 30C | current mirror |
| $32_1$–$32_n$ | output side transistors |
| 34 | input side transistors |
| 36 | transistor |
| 40 | correlated double sampling circuit |
| 42 | +1 amp |
| 44 | −1 amp |
| 46 | integrating amplifier |
| 50 | data bus |
| 52 | column selection transistors |
| 54 | row selection transistors |
| 100 | photosensor array |
| 110 | shutter |
| 120 | camera |
| 200 | optic array camera |
| 210 | lenslet array |
| 212 | achromatized refractive/diffractive lenslet |
| 213 | optical axis (central) |
| 214 | optical axis (central) |
| 215 | lines |
| 216 | opaque mask |
| 217 | photosensitive sites |
| 218 | light spacers and/or baffles |
| 222 | photosensors |
| 240 | field stop aperture plate |
| 250 | mechanical shutter |
| 252 | light tight housing |
| $T_o$ | output transistor |
| $T_I$ | input transistor |

I claim:

1. A photosensor array of pixels each of the pixels comprising:

a current generating photodetector having a photodiode that is operatively coupled in combination with an associated multiplying current mirror located within the pixel and comprised of one input transistor and at least two output transistors where the generated photocurrent from each photodetector is multiplied by an integer equal to the number of output transistors in the associated multiplying current mirror and to provide the multiplied current as an output signal; and wherein the output signal is selectively switched through a plurality of amplifiers having positive gain during periods where the photosensor is receiving incident light and negative gain during periods where the photosensor is not receiving incident light.

2. The photosensor array according to claim 1 and further comprising:

the plurality of amplifiers forming part of a correlated double sampling circuit connected to receive the output signal of an associated multiplying current mirror for providing an output that minimizes the dark current and noise from the current generating photodetectors.

3. The photosensor array according to claim 2 and further comprising:

row and column select means for connecting the output from the correlated double sampling circuits to a data bus.

4. The photosensor array according to claim 2 in combination with a camera wherein said photosensor array is exposed to the image to be captured by said camera so as to provide multiplied correlated double sampled current signals that represent said image to a data bus.

5. The photosensor array according to claim 1 and further comprising, a lenslet array having a number of lenslets corresponding in number to the number of current generating photodetectors each lenslet positioned so as to focus incident radiation onto an associated current generating photodetector, each lenslet being a refractive/diffractive lenslet wherein the center of the mechanical optical axis of each lenslet is displaced relative to the displacement of its associated photosensor's radial distance from the optical axis of the lenslet located in the center of the array.

6. A photosensor array of pixels within each of the pixels comprising:

a current generating photodetector having a photodiode that is operatively coupled in combination with an associated multiplying current mirror located within the pixel and comprised of one input transistor and at least one output transistor having an emitter area which is equal to an integer multiple of the input transistor emitter area where the generated photocurrent from each photodetector is multiplied by an integer equal to the ratio of the output divided by the input transistor emitter area so as to provide an integer multiplied current as an output signal; and wherein the output signal is selectively switched through a plurality of amplifiers having positive gain during periods where the photosensor is receiving incident light and negative gain during periods where the photosensor is not receiving incident light.

7. The photosensor array according to claim 6 and further comprising:

the plurality of amplifiers forming part of a correlated double sampling circuit connected to receive the output signal of an associated multiplying current mirror for providing an output that minimizes the dark current and noise from the current generating photodetectors.

8. The photosensor array according to claim 7 and further comprising:

row and column select means for connecting the output from the correlated double sampling circuits to a data bus.

9. The photosensor array according to claim 7 in combination with a camera wherein said photosensor array is exposed to the image to be captured by said camera so as to provide multiplied correlated double sampled current signals that represent said image to a data bus.

10. The photosensor array according to claim 6 and further comprising, a lenslet array having a number of lenslets corresponding in number to the number of current generating photodetectors each lenslet positioned so as to focus incident radiation onto an associated current generating photodetector, each lenslet being a refractive/diffractive lenslet wherein the center of the mechanical optical axis of each lenslet is displaced relative to the displacement of its associated photosensor's radial distance from the optical axis of the lenslet located in the center of the array.

11. A photosensor array of pixels each of the pixels comprising:

a current generating photodetector having a photodiode that is operatively coupled in combination with an associated multiplying current mirror located within the pixel and comprised of one input transistor and at least one output transistor where the emitter base voltage on the input transistor is biased to produce an integer multiple of the input current at the output transistor's emitter; and wherein the output signal is selectively switched through a plurality of amplifiers having positive gain during periods where the photosensor is receiving incident light and negative gain during periods where the photosensor is not receiving incident light.

12. The photosensor array according to claim 11 and further comprising:

the plurality of amplifiers forming part of a correlated double sampling circuit connected to receive the output signal of an associated multiplying current mirror for providing an output that minimizes the dark current and noise from the current generating photodetectors.

13. The photosensor array according to claim 12 and further comprising:

row and column select means for connecting the output from the correlated double sampling circuits to a data bus.

14. The photosensor array according to claim 12 in combination with a camera wherein said photosensor array is exposed to the image to be captured by said camera so as to provide multiplied correlated double sampled current signals that represent said image to the data bus.

15. The photosensor array according to claim 11 and further comprising, a lenslet array having a number of lenslets corresponding in number to the number of current generating photodetectors each lenslet positioned so as to focus incident radiation onto an associated current generating photodetector, each lenslet being a refractive/diffractive lenslet wherein the center of the mechanical optical axis of each lenslet is displaced relative to the displacement of its associated photosensor's radial distance from the optical axis of the lenslet located in the center of the array.

* * * * *